United States Patent
Leethaus et al.

(10) Patent No.: US 10,975,232 B2
(45) Date of Patent: Apr. 13, 2021

(54) ARTICLE, IN PARTICULAR AIR SPRING BELLOWS, A METAL-RUBBER ELEMENT, OR A VIBRATION DAMPER

(71) Applicant: ContiTech Luftfedersysteme GmbH, Hannover (DE)

(72) Inventors: Thorsten Leethaus, Eschershausen (DE); Dieter Borvitz, Hannover (DE); Klaus Schobert, Nienburg (DE); Barbara Passon-Wesseloh, Goettingen (DE); Jens Storre, Noerten-Hardenberg (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 16/956,394

(22) PCT Filed: Dec. 17, 2018

(86) PCT No.: PCT/EP2018/085121
§ 371 (c)(1),
(2) Date: Jun. 19, 2020

(87) PCT Pub. No.: WO2019/121456
PCT Pub. Date: Jun. 27, 2019

(65) Prior Publication Data
US 2020/0362147 A1 Nov. 19, 2020

(30) Foreign Application Priority Data
Dec. 21, 2017 (DE) ...................... 10 2017 223 541.1

(51) Int. Cl.
| | |
|---|---|
| *C08L 7/00* | (2006.01) |
| *C08L 11/00* | (2006.01) |
| *C08K 3/22* | (2006.01) |
| *C08K 7/18* | (2006.01) |
| *C08K 3/36* | (2006.01) |
| *C08K 3/016* | (2018.01) |
| *F16F 9/04* | (2006.01) |

(52) U.S. Cl.
CPC ...................... *C08L 7/00* (2013.01); *C08K 3/22* (2013.01); *C08K 3/36* (2013.01); *C08K 7/18* (2013.01); *C08L 11/00* (2013.01); *C08K 3/016* (2018.01); *C08K 2003/2227* (2013.01); *C08K 2201/005* (2013.01); *C08K 2201/014* (2013.01); *C08K 2201/019* (2013.01); *C08L 2201/02* (2013.01); *F16F 9/0409* (2013.01)

(58) Field of Classification Search
CPC ... C08L 7/00; C08L 11/00; C08K 7/18; C08K 3/36; C08K 3/22; F16F 9/0409
See application file for complete search history.

(56) References Cited

U.S. PATENT DOCUMENTS

| | | | |
|---|---|---|---|
| 5,119,927 A | 6/1992 | Bruggemann | |
| 2006/0084745 A1* | 4/2006 | Kuhn | C08L 83/04 524/492 |
| 2015/0011676 A1* | 1/2015 | Miyazaki | C08K 5/18 523/156 |
| 2016/0046781 A1 | 2/2016 | Miyazaki | |
| 2016/0052340 A1 | 2/2016 | Miyazaki et al. | |
| 2016/0137801 A1* | 5/2016 | Zauner | C08J 9/0061 521/59 |
| 2017/0152365 A1 | 6/2017 | Muratani et al. | |
| 2018/0202584 A1 | 7/2018 | Sato | |
| 2019/0062538 A1 | 2/2019 | Miyazaki | |
| 2020/0411209 A1* | 12/2020 | Hillborg | C08K 9/06 |

FOREIGN PATENT DOCUMENTS

| | | |
|---|---|---|
| EP | 1052655 A1 | 11/2000 |
| EP | 2985310 A1 | 2/2016 |
| EP | 3170863 A1 | 5/2017 |
| WO | 2016045813 A1 | 3/2016 |
| WO | 2017010279 A1 | 1/2017 |
| WO | 2017199688 A1 | 11/2017 |

* cited by examiner

*Primary Examiner* — Robert D Harlan
(74) *Attorney, Agent, or Firm* — David L. Cate; Gregory Adams

(57) ABSTRACT

The invention relates to an article having a single- or multi-layered main body having elastic properties, in particular an air spring bellows, a metal-rubber element or a vibration damper.

In order to improve its flame retardant properties, the main body of the article consists of or contains at least one layer D constructed from a rubber mixture which is free from halogen-containing flame retardants and contains a first aluminum trihydrate (ATH_1) and at least one further aluminum trihydrate (ATH_2) and at least one amorphous silicic acid having spherical particle geometry, wherein the first aluminum trihydrate (ATH_1) and the further aluminum trihydrate (ATH_2) each have a different particle size.

4 Claims, No Drawings

ARTICLE, IN PARTICULAR AIR SPRING BELLOWS, A METAL-RUBBER ELEMENT, OR A VIBRATION DAMPER

The invention relates to an article having a single- or multi-layered main body having elastic properties, in particular an air spring bellows, a metal-rubber element or a vibration damper.

Articles having elastic properties that are used for the suspension of, for example, motor vehicles or track vehicles and/or vibration damping are made using elastomeric mixtures, also known as rubber mixtures. These elastomeric mixtures typically used for the fundamental properties of such articles are well known. Articles having outstanding elastic properties, for example metal-rubber elements or vibration dampers, preferentially contain vulcanized mixtures of rubber which are predominantly based on natural rubber (NR) and/or polyisoprene rubber (IR). Articles having very good resistance to weathering, mineral oil and heat, examples being air spring bellows, preferentially contain vulcanized mixtures of rubber which are predominantly based on chloroprene rubber (CR). However, articles comprising these elastomeric mixtures display distinct disadvantages in fire behavior. The evolution of thick smoke is one of the consequences of a fire. The heat release rate is particularly high in the combustion process of the aforementioned elastomeric mixtures which are predominantly based on NR and/or IR. The evolving smoke from the combustion process of elastomeric mixtures based predominantly on CR is toxic to humans and animals.

The recent increase in fire safety requirements as reflected above all in the stricter fire safety standard EN45545 is driving an increased need for polymer articles optimized for fire safety. These fire safety requirements are no longer met both by the aforementioned elastomeric mixtures that are predominantly based on NR and/or IR, above all because of the required maximum heat release rate, but also by the flame-resistant elastomeric mixtures that are predominantly based on CR, particularly because of the required smoke toxicity. Articles containing these elastomeric mixtures thus usually no longer meet the stricter requirements.

A customary method of improving fire behavior of rubber mixtures is direct incorporation of sometimes comparatively large amounts of flame retardant substances. However in the mixtures concerned this measure generally results in impairment in physical properties, especially hardness for example, which is relevant for use in dynamic applications. This is reflected in the articles concerned especially in impaired cushioning, settling or vibration properties.

The present invention accordingly has for its object to provide an article having optimized fire safety behavior in order to meet stricter requirements, especially those described in EN-45545. In particular, at least Hazard Level 3, as described in the standard, shall be achieved. At the same time, the necessary physical properties of the article, especially hardness for example, shall remain at a comparable level.

This object is achieved when the article has a single-layered or multi-layered main body having elastic characteristics, wherein at least a layer D of the main body is constructed from a rubber mixture which is free from halogen-containing flame retardants and contains a first aluminum trihydrate (ATH_1) and at least one further aluminum trihydrate (ATH_2) and at least one amorphous silicic acid having spherical particle geometry, wherein the first aluminum trihydrate (ATH_1) and the at least one further aluminum trihydrate (ATH_2) each have a different particle size.

It has now been found that, surprisingly, the use of two ATH which have different particle sizes in combination with silicic acid having spherical particle geometry in rubber mixtures and in articles which contain at least one such rubber mixture shows improved flame retardancy.

This makes it possible to continue to utilize the advantages of natural rubber and/or chloroprene rubber in dynamically highly stressed articles without sacrificing physical properties, especially in terms of hardness.

In a preferred embodiment the first aluminum trihydrate (ATH_1) has a particle size $d_{50}$ determined by laser diffraction between 0.1 and 0.6 μm, while the further aluminum trihydrate (ATH_2) has a particle size $d_{50}$ determined by laser diffraction between 0.9 and 1.5 μm.

In a particular embodiment, the first aluminum trihydrate (ATH_1) is employed in preferred amounts of 15 to 40 phr and in particularly preferred amounts of 20 to 30 phr, while the further aluminum trihydrate (ATH_2) is employed in preferred amounts of 40 to 70 phr and in particularly preferred amounts of 45 to 55 phr.

The use of at least two ATH having different particle sizes results in an optimization of the packing density in the filler network, which in turn contributes to improved fire safety behavior.

In a preferred embodiment ATH_1 and/or ATH_2 may each be silanized. Silanization further optimizes fire safety behavior through improved bonding of the ATHs to a filler network.

Also essential to the invention is the presence of at least one amorphous silica having spherical particle geometry. Sphericity is a parameter which describes how spherical a particle or a body is. A very pronounced sphericity is present for example in the case of particles having an average particle diameter in the range from <1 μm to 5 μm and a polydispersity index PDI of <1.1. Compared to the known classical fillers, spherical filler particles do not form a so-called secondary filler structure but penetrate into the existing voids of the so-called primary filler structure, thus reinforcing it. This significantly improves the fire safety properties of the rubber mixture since, inter alia, the polymer chains are better shielded by the denser filler structure. The additional reduction of the Mooney viscosity also results in a better processability of the mixture.

It is preferable when the amount of the amorphous silica having spherical particle geometry is 5 to 35 phr, particularly preferably 8 to 20 phr. When more than one amorphous silica having spherical particle geometry is used, the reported amounts relate to the total amount of all employed amorphous silicas having spherical particle geometry.

In a preferred embodiment the rubber mixture of the layer D also contains at least one further flame retardant.

Contemplated here are in particular stannates, such as zinc stannate or zinc hydroxystannate, further hydroxides, such as magnesium hydroxide or calcium hydroxide, cyanurates, such as melamine cyanurate, borates, such as zinc borate or calcium borate, phosphorus-containing components, such as resorcinol diphosphate, melamine phosphate or aromatic polyphosphates, nitrogen-containing components, such as ammonium phosphate, intumescent mixtures, carbonates, such as calcium carbonate or magnesium carbonate, or expandable graphite.

Intumescent mixtures expand to afford foams. They are used to provide protection from the effects of heat and fire to combustible materials such as plastics or wood, and also steel, which suffers a loss of strength at elevated temperature.

It is optionally also possible to employ small amounts of antimony trioxide in combination with at least one of the recited flame retardants despite its health hazardous properties.

In an advantageous embodiment the rubber mixture of the layer D also contains at least one acid scavenger which further reduces the toxicity of the resulting smoke gas. The acid scavenger is preferably at least one oxide, wherein calcium oxide and magnesium oxide are particularly suitable alone or in combination.

However, it has proven particularly advantageous when the rubber mixture of layer D also contains at least one combination of hydromagnesite $(Mg_5(CO_3)_4(OH)_2.4H_2O)$ and huntite $(Mg_3Ca(CO_3)_4)$, preferably in amounts of 3 to 80 phr, particularly preferably in amounts of 10 to 50 phr. The presence of a combination of hydromagnesite and huntite in a rubber mixture of layer D has the result that, in the event of fire, an additional cement-like layer forms by carbonization at the surface of the layer D.

The rubber mixture of the layer D contains at least one rubber component, which is preferably selected from the group consisting of ethylene-propylene copolymer (EPM) and/or ethylene-propylene-diene copolymer (EPDM) and/or nitrile rubber (NBR) and/or caboxylated nitrile rubber (XNBR) and/or (partially) hydrogenated nitrile rubber (HNBR) and/or fluorine rubber (FKM) and/or chloroprene rubber (CR) and/or natural rubber (NR) and/or epoxidized natural rubber (ENR) and/or styrene-butadiene rubber (SBR) caboxylated styrene-butadiene rubber (XSBR) and/or isoprene rubber (IR) and/or butyl rubber (IIR) and/or bromobutyl rubber (BIIR) and/or chlorobutyl rubber (CIIR) and/or butadiene rubber (BR) and/or chlorinated polyethylene (CM) and/or chlorosulfonated polyethylene (CSM) and/or alkylated chlorosulfonated polyethylene (ACSM) and/or polyepichlorohydrin rubbers (CO; ECO; ETER) and/or ethylene-vinyl acetate rubber (EVA) and/or acrylate rubber (ACM) and/or ethylene-acrylate rubber (AEM) and/or silicone rubber (MQ, VMQ, PVMQ, FVMQ) and/or fluorinated methyl silicone rubber (MFQ) and/or perfluorinated propylene rubber (FFPM) and/or perfluorocarbon rubber (FFKM) and/or polyurethane (PU). The recited rubbers may be employed alone or in a blend.

The rubber component of the rubber mixture of the layer D preferably consists of a rubber or of a rubber blend of at least two rubbers which each provide the mixture with a primarily low flammability and/or have good physical properties for use in dynamically highly stressed articles. These include in particular NR, ENR, IR, CR, CM, CSM, ACSM, BR, NBR, XNBR, HNBR. In a particularly preferred embodiment the rubber component of the rubber mixture of the layer D consists of 100 phr of CR or of a rubber blend of CR and NR (CR/NR).

The main body may either be constructed only of the layer D or else may contain at least one further layer. If further layers are present then the layer D is preferably the outermost outward-facing layer of the article. However, it is also possible for the layer D to be embedded between further layers.

If the layer D is the outermost layer or if the layer D is embedded between further layers, it may be the case in a preferred embodiment that the layer D does not completely envelop the main body but rather is merely partially present, especially in places particularly exposed to fire risk.

Thus for example a further layer A which forms the so-called "inner cap" and which is constructed from an elastomer mixture and has particularly good elastic properties may be present. The elastomer mixture is a vulcanizable, preferably thermoplastic-free, rubber mixture containing at least one rubber component and further mixing ingredients. Contemplated rubber components especially include: ethylene-propylene rubber (EPM), ethylene-propylene-diene rubber (EPDM), nitrile rubber (NBR), carboxylated nitrile rubber (XNBR), (partially) hydrogenated nitrile rubber (HNBR), fluoro rubber (FKM), chloroprene rubber (CR), natural rubber (NR), epoxidized natural rubber (ENR), styrene-butadiene rubber (SBR), caboxylated styrene-butadiene rubber (XSBR), isoprene rubber (IR), butyl rubber (IIR), bromobutyl rubber (BIIR), chlorobutyl rubber (CIIR), brominated copolymer of isobutylene and para-methylstyrene (BIMS), butadiene rubber (BR), chlorinated polyethylene (CM), chlorosulfonated polyethylene (CSM), alkylated chlorosulfonated polyethylene (ACSM), polyepichlorohydrin rubbers (CO; ECO; ETER), ethylene-vinyl acetate rubber (EVA), acrylate rubber (ACM), ethylene-acrylate rubber (AEM), silicone rubber (MQ, VMQ, PVMQ, FVMQ), fluorinated methylsilicone rubber (MFQ), perfluorinated propylene rubber (FFPM), perfluorocarbon rubber (FFKM), polyurethane (PU). The abovementioned rubber types may be unblended. The use of a blend is also possible.

The rubber type preferred depends on the article type and the demands on the individual article. The usual mixture ingredients comprise at least one crosslinker or one crosslinker system (crosslinking agent and accelerator). Additional mixing ingredients are usually at least one filler and/or at least one processing aid and/or at least one plasticizer, for example phosphate ester plasticizers, and/or at least one aging stabilizer and optionally further additives, for example color pigments, reinforcing fibers, etc.

Reference is made in this connection to the general prior art in rubber mixing technology. The composition of the rubber mixture of layer A may be qualitatively and/or quantitatively identical or different to the rubber mixture of the layer D.

If the rubber mixture of the layer A is qualitatively and quantitatively identical to the rubber mixture of the layer D, i.e. similarly fire-retarded, the fire-promoting gases and substances formed in case of fire can pass through to the outside only with a delay, if at all, and can thus amplify an article fire only to a reduced extent, if at all. In addition, any strength member layers present which may be fast-melting, see layer B, are thus better protected or do not pass through to the outside.

At least one layer B which is formed from at least one strength member may also be present in a particular embodiment. This is preferably a cord weave composed of one or more plies, preferably of two plies, having good adhesion to the layer A. In a very particularly preferred embodiment this is a BiStretch fabric as described for example in WO 2016045813 A1.

Materials used for the layer B may be any known synthetic and natural materials alone or in combination, i.e. in the form of a hybrid fabric. Contemplated synthetic materials especially include synthetic polymers, for example acrylonitrile, polyacrylonitrile, polypropylene, polyester, polyamide, polyurethane, polyphenylene sulfide, polyoxadiazole, aramids, such as p-aramid, m-aramid or copoly-para-aramid, polyimide, polyetherimide, polyetheretherketone, polyethylene 2,6-naphthalate, polyphenylene, polyphenylene oxide, polyphenylene sulfide, polyphenylene ether, polybenzoxazoles, polyvinyl alcohol.

The natural materials may be rockwool or asbestos, cotton, flax or hemp, or wool or silk. Inorganic materials such as glass, ceramic, carbon, metal, for example steel, or stone, for example basalt, are likewise conceivable.

Preference is given to polyamide, especially PA 6,6, or polyester, alone or in combination. In order to achieve sufficient processing stickiness during the production process for the article, the cord fabric may be rubberized or frictionized on one or both sides.

Rubberization may preferably be accomplished either using a composition which is quantitatively and/or qualitatively identical to the composition for the layer C or is quantitatively and/or qualitatively identical to the composition for the layer A. This simplifies the production process for the article and contributes to a dynamically suitable adhesive bond.

In a further preferred embodiment the article may further contain at least one additional layer C.

The layer C then forms the so-called "outer cap" of the article. The layer C may be a one-ply or two-ply layer. The elastomer mixture of the layer C is a vulcanizable, preferably thermoplastic-free, rubber mixture containing at least one rubber component and further mixture ingredients. Contemplated rubber components especially include: ethylene-propylene rubber (EPM), ethylene-propylene-diene rubber (EPDM), nitrile rubber (NBR), carboxylated nitrile rubber (XNBR), (partially) hydrogenated nitrile rubber (HNBR), fluoro rubber (FKM), chloroprene rubber (CR), natural rubber (NR), epoxidized natural rubber (ENR), isoprene rubber (IR), styrene-butadiene rubber (SBR), caboxylated styrene-butadiene rubber (XSBR), butyl rubber (IIR), bromobutyl rubber (BIIR), chlorobutyl rubber (CIIR), brominated copolymer of isobutylene and para-methylstyrene (BIMS), butadiene rubber (BR), chlorinated polyethylene (CM), chlorosulfonated polyethylene (CSM), alkylated chlorosulfonated polyethylene (ACSM), polyepichlorohydrin rubbers (CO; ECO; ETER), ethylene-vinyl acetate rubber (EVA), acrylate rubber (ACM), ethylene-acrylate rubber (AEM), silicone rubber (MQ, VMQ, PVMQ, FVMQ), fluorinated methylsilicone rubber (MFQ), perfluorinated propylene rubber (FFPM), perfluorocarbon rubber (FFKM), polyurethane (PU). The abovementioned rubber types may be unblended. The use of a blend is also possible. The type of rubber preferred depends on the nature of the article. The usual mixture ingredients comprise at least one crosslinker or one crosslinker system (crosslinking agent and accelerator). Additional mixture ingredients usually further include a filler and/or a processing aid and/or a plasticizer and/or an aging stabilizer and also optionally further additives (for example color pigments, adhesion promoters, flame retardants, reinforcing fibers). Reference is made in this connection to the general prior art in rubber mixture technology.

The article may also contain at least one further layer E based on at least one thermoplastic. Employable thermoplastics include for example polyolefin, especially polyethylene (PE), such as LD-PE, LLD-PE, UHMW-PE, or polypropylene (PP), polystyrene (PS), polyamide (PA), for example PA 6 or PA 6,6, polyesters, for example PET, PEN or PBT. In a particularly preferred embodiment the layer E is in the form of a film. The use of PE film has been found to be particularly suitable since it forms a particularly good adhesive bond especially in the case of peroxidically cross-linking elastomer mixtures, thus making it possible in some cases to dispense with further adhesion promoters. The layer E has a particularly good adhesion-enhancing effect depending on the nature of the article and the nature of the further layers. It can be applied to the article blank with the aid of a radiant heater and pressure.

The article is preferably an air spring bellows, a metal-rubber element, a vibration damper or a damping element of a bearing, of a bushing or of a multilayered spring or conical spring. The article may alternatively be a tubular body. Tubular bodies are, for example, feed hoses of any kind, air spring bellows (cross-ply bellows, axial bellows) and compensators in various embodiments (e.g., torsion compensator, lateral compensator).

The article may likewise be a drive belt.

The article is preferably an air spring bellows, a metal-rubber element, a vibration damper or a bearing, for example box bearing or a conical bearing, more particularly a moulded article for rubber-sprung rail vehicle wheels.

The invention claimed is:

1. An article comprising at least a single-layered main body having elastic characteristics, wherein a layer of the at least a single-layered main body is constructed from a rubber mixture which is free from halogen-containing flame retardants and contains a first aluminum trihydrate and at least one further aluminum trihydrate and at least one amorphous silicic acid having spherical particle geometry, and wherein the first aluminum trihydrate and the at least one further aluminum trihydrate each have a different particle size;

wherein particle size $D_{50}$ of the first aluminum trihydrate determined by laser diffraction is between 0.1 and 0.6 µm and the at least one further aluminum trihydrate has a particle size $D_{50}$ determined by laser diffraction of between 0.9 and 1.5 µm; and, wherein the first aluminum trihydrate is incorporated in the at least a single-layered main body in an amount of from 15 to 40 phr, and wherein the layer of the at least a single-layered main body comprises 100 phr of CR or 100 phr of a blend of chloroprene rubber and natural rubber as the rubber component.

2. The article as claimed in claim 1, wherein the at least one further aluminum trihydrate is incorporated in the layer of the at least a single-layered main body in an amount of from 40 to 70 phr.

3. The article as claimed in claim 1, wherein the rubber mixture of the layer of the at least a single-layered main body further comprises a combination of hydromagnesite and huntite.

4. The article as claimed in claim 1, wherein the article is an air spring bellows, a metal-rubber element, a vibration damper, a damping element of a bearing of a bushing, a damping element of a multilayered spring, a damping element of a conical spring, a tubular body or a drive belt.

* * * * *